(12) United States Patent
Heibel

(10) Patent No.: US 11,430,578 B2
(45) Date of Patent: Aug. 30, 2022

(54) SUBCRITICAL REACTIVITY MONITOR UTILIZING PROMPT SELF-POWERED IN-CORE DETECTORS

(71) Applicant: Westinghouse Electric Company LLC, Cranberry Township, PA (US)

(72) Inventor: Michael D. Heibel, Harrison City, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 110 days.

(21) Appl. No.: 16/850,251

(22) Filed: Apr. 16, 2020

(65) Prior Publication Data
US 2020/0365285 A1 Nov. 19, 2020

Related U.S. Application Data

(63) Continuation of application No. 14/939,116, filed on Nov. 12, 2015, now abandoned.

(51) Int. Cl.
*G21C 17/104* (2006.01)
*G21C 17/108* (2006.01)
(Continued)

(52) U.S. Cl.
CPC .............. *G21C 17/104* (2013.01); *G21C 7/22* (2013.01); *G21C 7/24* (2013.01); *G21C 9/02* (2013.01);
(Continued)

(58) Field of Classification Search
CPC ...... G21C 17/104; G21C 17/108; G21C 7/22; G21C 7/06; G21D 3/001; G21D 3/06
See application file for complete search history.

(56) References Cited

U.S. PATENT DOCUMENTS 4,588,547 A 5/1986 Impink, Jr
5,251,242 A 10/1993 Impink, Jr
(Continued)

FOREIGN PATENT DOCUMENTS

EP 2650882 A 10/2013
GB 25199200 A 5/2015
(Continued)

OTHER PUBLICATIONS

International Search Report and Written Opinion for International PCT Application No. PCT/US2016/058406 dated May 17, 2017.

*Primary Examiner* — Sharon M Davis
(74) *Attorney, Agent, or Firm* — K&L Gates LLP (57) ABSTRACT

A subcritical reactivity monitor that utilizes one or more primarily gamma sensitive (prompt responding) self-powered detector style radiation measurement devices located within the core of a nuclear reactor to determine the amount that the reactor multiplication factor ($K_{eff}$) is below the reactivity required to achieve or maintain a self-sustaining nuclear chain reaction. This invention utilizes measured changes in the self-powered detectors' current(s) to allow a reactor operator to measure the value of $K_{eff}$ at essentially any desired interval while the reactor is shutdown with a $K_{eff}$ value less than the critical value of 1.0. This invention will enable integration of the output of the value of $K_{eff}$ directly into the Reactor Protection System, which will enable the elimination of the operational and core design analysis constraint costs associated with the current Boron Dilution Accident prevention methodology and enable automatic control of the Chemical Volume Control System.

12 Claims, 4 Drawing Sheets

(51) Int. Cl.
*G21D 3/00* (2006.01)
*G21C 9/02* (2006.01)
*G21C 7/22* (2006.01)
*G21C 7/24* (2006.01)
*G21C 19/28* (2006.01)

(52) U.S. Cl.
CPC ............ G21C 17/108 (2013.01); G21D 3/001 (2013.01); *G21C 19/28* (2013.01); *Y02E 30/30* (2013.01)

(56) References Cited

U.S. PATENT DOCUMENTS

| | | | | |
|---|---|---|---|---|
| 5,745,538 | A * | 4/1998 | Heibel | G21C 17/108 376/153 |
| 6,181,759 | B1 * | 1/2001 | Heibel | G21C 17/104 376/214 |
| 6,400,786 | B1 | 6/2002 | Mourlevat | |
| 9,020,091 | B2 | 4/2015 | Lu et al. | |
| 2010/0150295 | A1 * | 6/2010 | Heibel | G21C 17/104 376/254 |
| 2011/0002432 | A1 | 1/2011 | Heibel | |
| 2011/0064181 | A1 | 3/2011 | Moen | |
| 2012/0091324 | A1 | 4/2012 | Holaday et al. | |
| 2012/0177166 | A1 | 7/2012 | Seidel | |
| 2013/0083879 | A1 | 4/2013 | Heibel et al. | |
| 2013/0136222 | A1 | 5/2013 | Nagai | |
| 2014/0321592 | A1 | 10/2014 | Popa | |

FOREIGN PATENT DOCUMENTS

| | | |
|---|---|---|
| JP | 2014503070 A | 2/2014 |
| WO | 2017083083 A2 | 5/2017 |

* cited by examiner

SUBCRITICAL REACTIVITY MONITOR UTILIZING PROMPT SELF-POWERED IN-CORE DETECTORS

CROSS-REFERENCE TO RELATED APPLICATION

This application is a continuation claiming priority under 35 U.S.C. § 120 to U.S. patent application Ser. No. 14/939,116 filed on Nov. 12, 2015, and entitled "SUBCRITICAL REACTIVITY MONITOR UTILIZING PROMPT SELF-POWERED INCORE DETECTORS," all of which is hereby incorporated herein by reference in its entirety.

BACKGROUND

1. Field

This invention relates to conditions in a nuclear-fueled power-generating unit, and more particularly, to methods and apparatus for determining the effective neutron multiplication factor in a nuclear reactor.

2. Related Art

The primary side of nuclear power generating systems which are cooled with water under pressure comprises a closed circuit which is isolated and in heat exchange relationship with a secondary side for the production of useful energy. The primary side comprises the reactor vessel enclosing a core internal structure that supports a plurality of fuel assemblies containing fissile material, the primary circuit within heat exchange steam generators, the inner volume of a pressurizer, pumps and pipes for circulating pressurized water; the pipes connecting each of the steam generators and pumps to the reactor vessel independently. Each of the parts of the primary side comprising a steam generator, a pump and a system of pipes which are connected to the vessel form a loop of the primary side.

Figure 1:
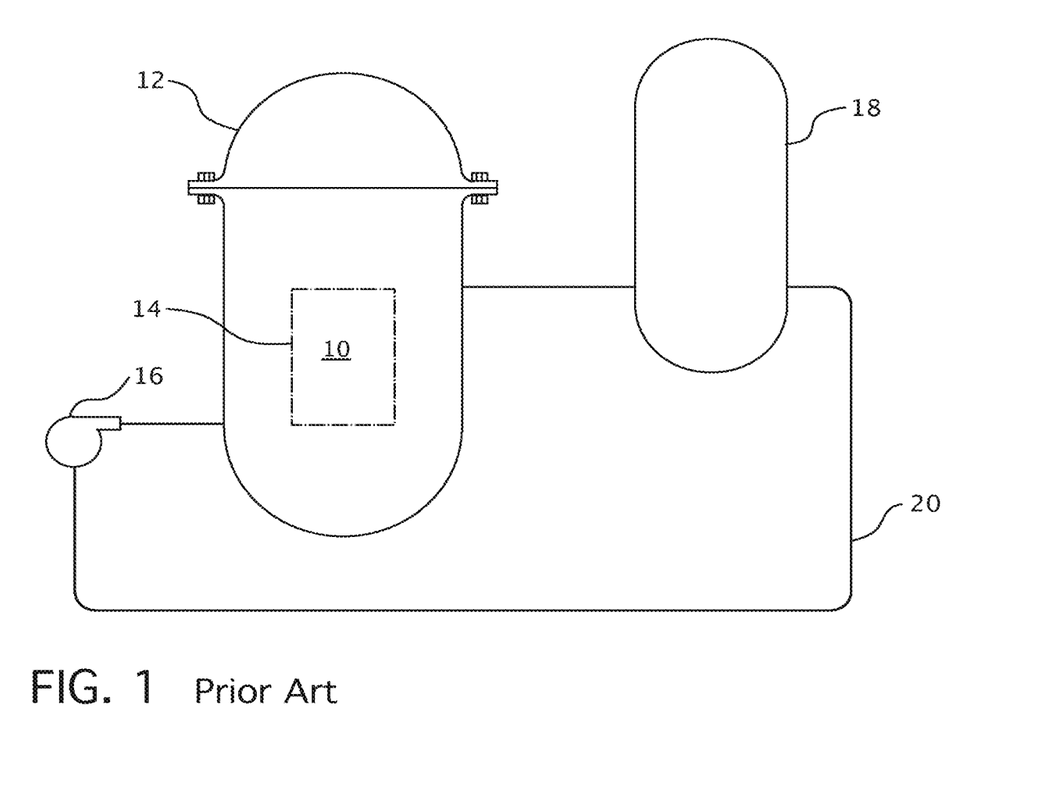
FIG. 1 is a simplified schematic of a nuclear reactor system to which this invention can be applied.

For the purpose of illustration, FIG. 1 shows a simplified nuclear reactor primary system, including a generally cylindrical reactor pressure vessel 10 having a closure head 12 enclosing a nuclear core 14. A liquid reactor coolant, such as water, is pumped into the vessel 10 by pump 16 through the core 14 where heat energy is absorbed and is discharged to a heat exchanger 18, typically referred to as a steam generator, in which heat is transferred to a utilization circuit (not shown), such as a steam driven turbine generator. The reactor coolant is then returned to the pump 16, completing the primary loop. Typically, a plurality of the above described loops are connected to a single reactor vessel 10 by reactor coolant piping 20.

Figure 2:
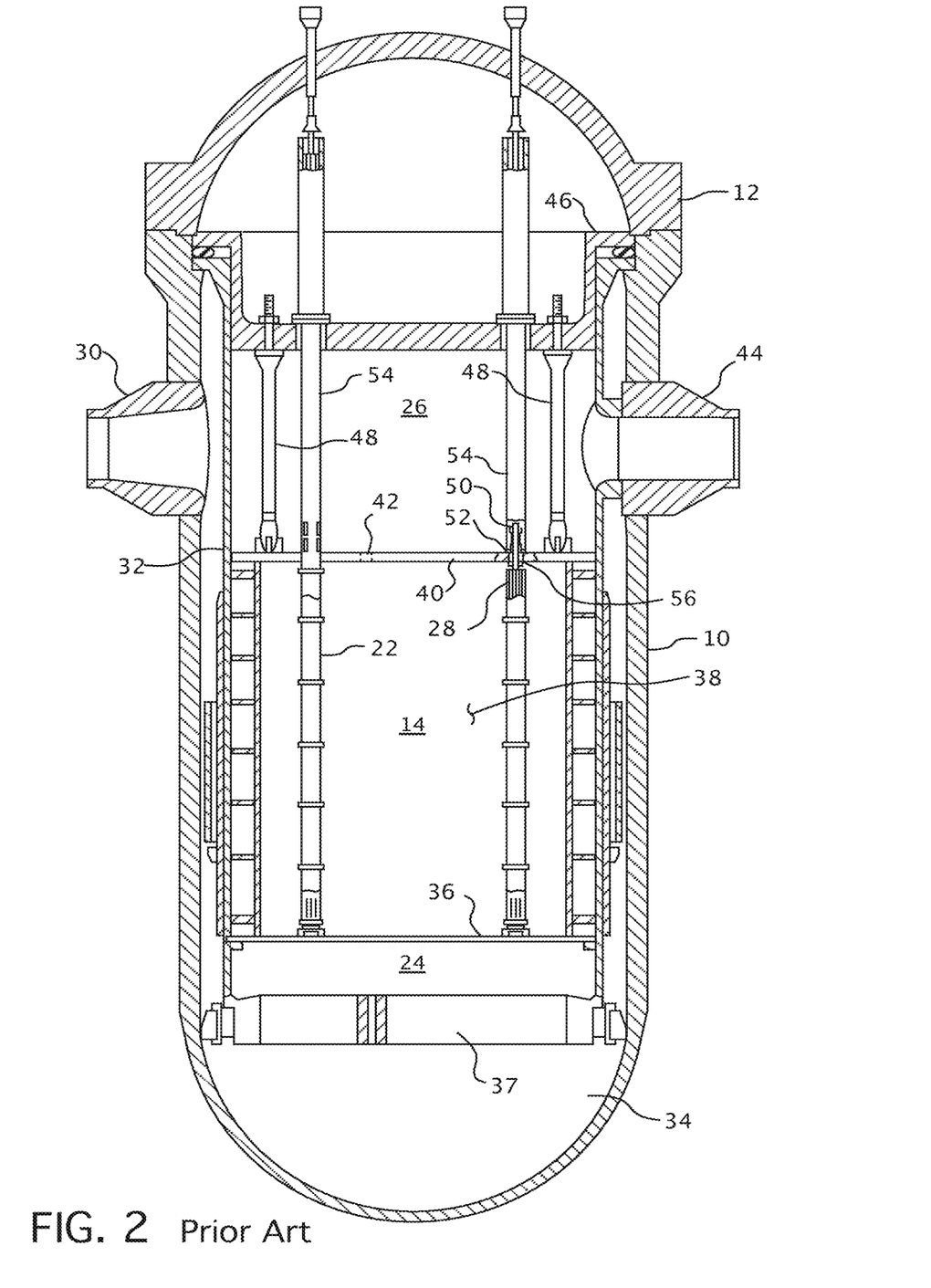
FIG. 2 is an elevational view, partially in section, of a nuclear reactor vessel and internal components to which this invention can be applied.

An exemplary reactor design is shown in more detail in FIG. 2. In addition to the core 14 comprised of a plurality of parallel, vertical, co-extending fuel assemblies 22, for purposes of this description, the other vessel internal structures can be divided into the lower internals 24 and the upper internals 26. In conventional designs, the lower internals function is to support, align and guide core components and instrumentation as well as direct flow within the vessel. The upper internals restrain or provide a secondary restraint for the fuel assemblies 22 (only two of which are shown for simplicity in this figure), and support and guide instrumentation and components, such as control rods 28. In the exemplary reactor shown in FIG. 2, coolant enters the reactor vessel 10 through one or more inlet nozzles 30, flows down through an annulus between the vessel and the core barrel 32, is turned 180° in a lower plenum 34, passes upwardly through a lower support plate 37 and a lower core plate 36 upon which the fuel assemblies 22 are seated and through and about the assemblies. In some designs, the lower support plate 37 and the lower core plate 36 are replaced by a single structure, the lower core support plate, at the same elevation as the lower support plate 37. The coolant flow through the core and surrounding area 38 is typically large on the order of 400,000 gallons per minute at a velocity of approximately 20 feet per second. The resulting pressure drop and frictional forces tend to cause the fuel assemblies to rise, which movement is restrained by the upper internals, including a circular upper core plate 40. Coolant exiting the core 14 flows along the underside of the upper core plate 40 and upwardly through a plurality of perforations 42. The coolant then flows upwardly and radially to one or more outlet nozzles 44.

The upper internals 26 can be supported from the vessel or the vessel head and include an upper support assembly 46. Loads are transmitted between the upper support assembly 46 and the upper core plate 40, primarily by a plurality of support columns 48. A support column is aligned above a selected fuel assembly 22 and perforations 42 in the upper core plate 40.

The rectilinearly moveable control rods 28 typically include a drive shaft 50 and a spider assembly 52 of neutron poison rods that are guided through the upper internals 26 and into aligned fuel assemblies 22 by control rod guide tubes 54. The guide tubes are fixedly joined to the upper support assembly 46 and connected by a split pin 56 force fit into the top of the upper core plate 40. The pin configuration provides for ease of guide tube assembly and replacement if ever necessary and assures that the core loads, particularly under seismic or other high loading accident conditions are taken primarily by the support columns 48 and not the guide tubes 54. This support column arrangement assists in retarding guide tube deformation under accident conditions which could detrimentally affect control rod insertion capability.

Figure 3:
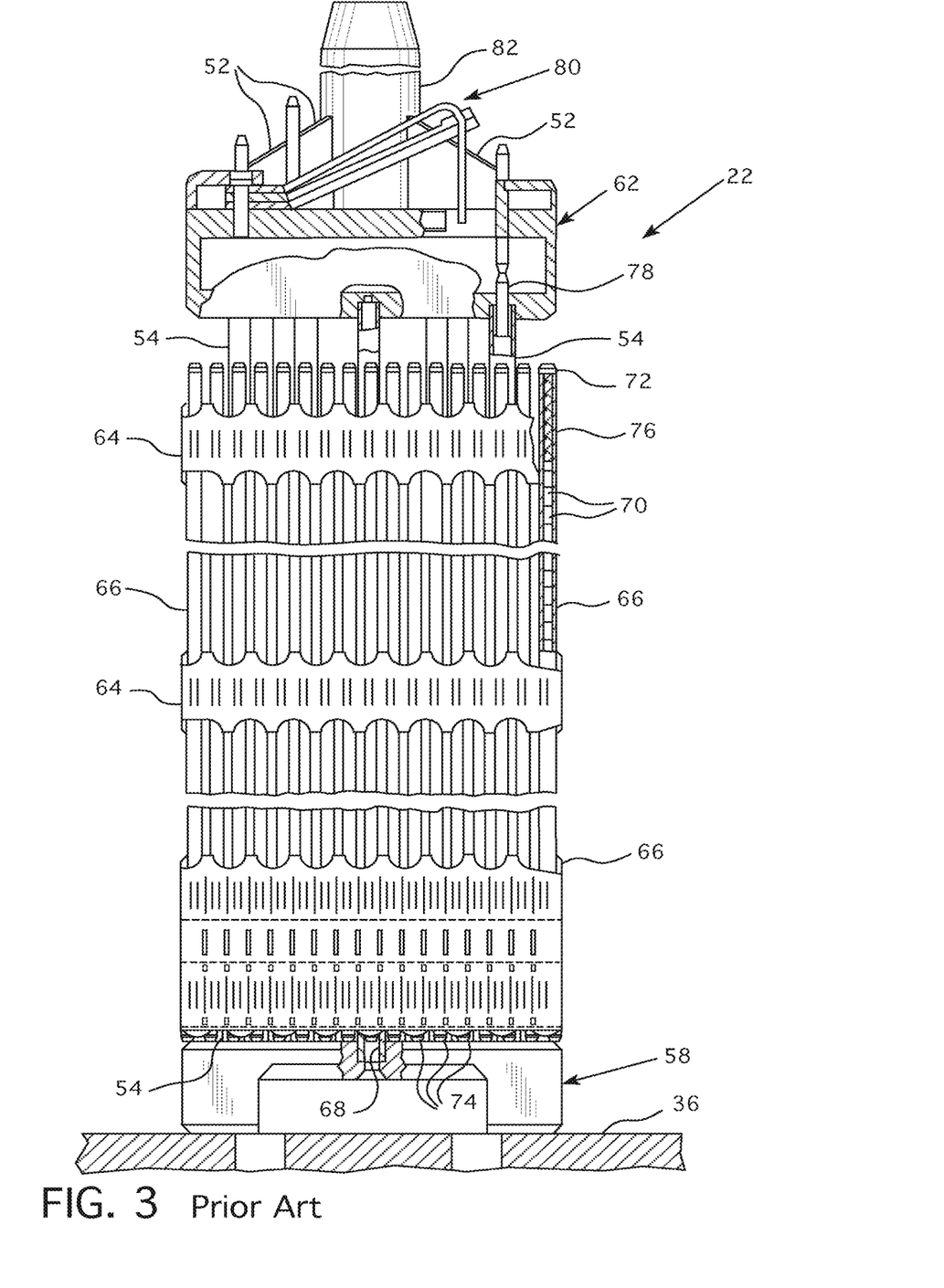
FIG. 3 is an elevational view, partially in section, of a fuel assembly illustrated in vertically shortened form, with parts broken away for clarity.

FIG. 3 is an elevational view, represented in vertically shortened form, of a fuel assembly being generally designated by reference character 22. The fuel assembly 22 is the type used in a pressurized water reactor and has a structural skeleton which, at its lower end includes a bottom nozzle 58. The bottom nozzle 58 supports the fuel assembly 22 on a lower core plate 36 in the core region of the nuclear reactor. In addition to the bottom nozzle 58, the structural skeleton of the fuel assembly 22 also includes a top nozzle 62 at its upper end and a number of guide tubes or thimbles 54, which extend longitudinally between the bottom and top nozzles 58 and 62 and at opposite ends are rigidly attached thereto.

The fuel assembly 22 further includes a plurality of transverse grids 64 axially spaced along and mounted to the guide thimbles 54 (also referred to as guide tubes) and an organized array of elongated fuel rods 66 transversely spaced and supported by the grids 64. Although it cannot be seen in FIG. 3, the grids 64 are conventionally formed from orthogonal straps that are interleafed in an egg-crate pattern with the adjacent interface of four straps defining approximately square support cells through which the fuel rods 66 are supported in transversely spaced relationship with each other. In many conventional designs springs and dimples are stamped into the opposing walls of the straps that form the support cells. The springs and dimples extend radially into the support cells and capture the fuel rods therebetween, exerting pressure on the fuel rod cladding to hold the rods in position. Also, the fuel assembly 22 has an instrumentation tube 68 located in the center thereof that extends between and is mounted to the bottom and top nozzles 58 and 62. With such an arrangement of parts, fuel assembly 22 forms an integral unit capable of being conveniently handled without damaging the assembly of parts.

The power level of a nuclear reactor is generally divided into three ranges: the source or start-up range, the intermediate range, and the power range. The power level of the reactor is continuously monitored to assure safe operation. Such monitoring is typically conducted by means of neutron detectors placed outside and inside the reactor core for measuring the neutron flux of the reactor. Since the neutron flux at any point in the reactor is proportional to the fission rate, the neutron flux is also proportional to the power level.

Fission and ionization chambers have been used to measure flux in the intermediate and power range of a reactor. Such fission and ionization chambers are capable of operation at all normal power levels, however, they are generally not sensitive enough to accurately detect low level neutron flux emitted in the source range. Thus, separate low level source range detectors are typically used to monitor neutron flux when the power level of the reactor is in the source range.

U.S. Pat. No. 4,588,547 discloses a method and apparatus for determining the nearness to criticality of a nuclear reactor. That invention takes advantage of the fact that when the reactor is subcritical, the neutron flux generated by an artificial neutron source, and the direct progeny by fission, is higher than that generated by neutrons from natural neutron sources in the reactor fuel and progeny of those neutrons. However, that patent does not address the approach to criticality when a reactor approaches criticality due to withdrawal of control rods.

In the absence of a neutron source, the ratio of the number of free neutrons in one generation to those in the previous generation is referred to as the "Neutron Multiplication Factor" ($K_{eff}$) and is used as a measure of the reactivity of the reactor. In other words, the measure of criticality for a nuclear core is $K_{eff}$, that is, the ratio of neutron production to total neutron loss contributable to both destruction and loss. When $K_{eff}$ is greater than 1, more neutrons are being produced than are being destroyed (i.e., destroyed and lost). Similarly, when $K_{eff}$ is less than 1, more neutrons are being destroyed than are being produced. When $K_{eff}$ is less than 1, the reactor is referred to as being "subcritical". Currently, there is no direct method for measuring when criticality will occur from the source range ex-core detectors. Presently, plant operators estimate when criticality will occur through a number of methods. One method for estimating when criticality will occur is made by plotting the inverse ratio of the count rate obtained from the source range detector as a function of the change in the condition being used to bring the plant critical, e.g., withdrawal of the control rods. When the plant goes critical, the source range count rate approaches infinity and hence, the Inverse Count Rate Ratio (ICRR) goes to zero. Due to the physics of the reactions occurring within the core-of the reactor, the ICRR curve is almost always convex, and sometimes concave. Therefore, estimating the conditions under which the plant will go critical from the ICRR curve is subject to much uncertainty, but also subject to considerable scrutiny by the Nuclear Regulatory Commission and International Nuclear Power Organization.

During the approach to reactor criticality, the signals from the source detectors are typically used to determine whether the reactor is critical or will achieve criticality before the scheduled or planned core conditions are achieved. Assemblies of control rods in the form of control banks, are used to regulate reactor activity through controlled absorption of the neutrons released in the fission process. When a reactor is to be made critical by withdrawal of the control banks, which is the typical method used for all reactor startups following the initial startup in each operating cycle, changes in control bank position cause changes in the magnitude of the source range detector signals which are not entirely indicative of core reactivity changes. This behavior makes it difficult for the reactor operator to use the source range detector information properly. Ideally, the reactor operator would like to be able to not only determine whether the reactor is currently critical, or is likely to be critical before the planned critical conditions are achieved, but how close to critical the core actually is. In order to accurately determine how close the reactor is to critical, a means of using the source range detector signal information that does not rely only on the magnitude of the signal change from one control bank configuration to another is required.

U.S. Pat. No. 6,181,759, assigned to the assignee of the instant invention, addressed this need by providing a method for determining the closeness to criticality of a nuclear reactor during start-up, comprising the steps of completing a control rod withdrawal step, thereby generating a change in an output signal of a neutron detector; measuring the output signal after the completion of the control rod withdrawal step and during a transient portion of the output signal; calculating the effective neutron multiplication factor ($K_{eff}$) based upon the measured output signal and elapsed time between the output signal measurements; and determining the closeness to criticality of the nuclear reactor based upon the calculated value of the effective neutron multiplication factor ($K_{eff}$). However, this solution is still an estimate and does not raise confidence as to the estimate of the closeness to criticality which can be used to establish automatic control of the reactor's Chemical Volume Control System that will assure the reactor system remains below criticality.

Self-powered fixed in-core detectors are currently used to monitor the power range of the reactor. The self-powered fixed in-core detectors (FID) are commonly used for measurement of the core power distribution in commercial nuclear power reactors. One type of self-powered FID utilizes neutron sensitive material, with rhodium being the most commonly used sensor element of this type. While such detector elements provide a direct measure of neutron flux, which in turn is directly related to core power, the materials of this type which are more responsive to neutrons are fairly rapidly depleted.

Another type of self-powered FID utilizes material sensitive to gamma radiation. While about 80% of the gamma radiation generated in the core is produced by the fission reaction and is therefore representative of core power, the remaining 20% is produced by products of fission and is delayed in time. While the gamma sensitive elements are not depleted by the neutron flux, they require complex electronics or reactor physics methods to provide a measure of reactor power distribution.

A need exists to use the benefits of self-powered detectors, in that they provide an output at all power levels without external power, by identifying and subtracting from those outputs contributions from fission byproducts that mask a true power reading that can be relied upon for automatic control of the subcritical state of the reactor.

SUMMARY

This invention achieves the foregoing objectives by providing a nuclear reactor system comprising a pressure vessel housing a nuclear core and a volume of coolant within the nuclear core; a plurality of fuel assemblies are housed within the nuclear core with at least some of the fuel assemblies having one or more, primarily gamma sensitive, prompt responding self-powered neutron detectors located therein, responsive to the fission reaction activity within the core to provide an output indicative thereof. A subcritical reactivity monitor receives the output from the one or more of the primarily gamma sensitive, self-powered neutron detectors and is responsive thereto to generate a core average value of the gamma radiation distribution within the core. A processing system is configured to receive the core average value of the gamma radiation distribution and calculate a value of $K_{eff}$ in accordance with the following equation;

$$K_{eff}(t) = 1 - \frac{f(t_{Ref})I_{Ref}}{f(t)I(t)}(1 - K_{Ref});$$

and output the value of $K_{eff}$. A chemical volume control system configured to receive the value of $K_{eff}$ and initiate a triggering signal that adds Boron to the coolant in the event a predetermined, undesirable change in $K_{eff}$ is detected.

Preferably, the value of $K_{eff}$ is monitored continuously during a shutdown period of the nuclear reactor system. In one embodiment the subcritical reactivity monitor is configured to determine the fraction of the output from the primarily gamma sensitive, self-powered neutron detectors caused by gamma radiation released by fission byproducts in the vicinity of the primarily gamma sensitive, self-powered neutron detectors and, the fraction of the measured output caused directly by subcritical fission events. In one such embodiment the fraction of the output of the gamma sensitive, self-powered neutron detectors due to fission byproducts is subtracted from the output of the primarily gamma sensitive, self-powered neutron detectors to determine a real-time value of $K_{eff}$.

In still another embodiment the nuclear reactor system includes a source range detector for monitoring fission events within the core when the reactor is below criticality and provides an output from which the fission events can be determined. The source range detector is positioned outside of the pressure vessel and the value of $K_{eff}$ is calculated without input from the source range detector. Desirably, the Chemical Volume Control System automatically adds Boron to the coolant in the event a predetermined, undesirable change in $K_{eff}$ is detected.

BRIEF DESCRIPTION OF THE DRAWINGS

A further understanding of the invention can be gained from the following description of the preferred embodiments when read in conjunction with the accompanying drawings in which.

DESCRIPTION OF THE PREFERRED EMBODIMENT

Commercial nuclear reactor operators are required to ensure that the reactor remains shut down by a minimum margin as defined by plant technical specifications (Tech Specs). The amount of reactor shutdown is determined via the calculated value of $K_{eff}$; specifically by the amount that $K_{eff}$ is less than 1.0, defined as the Shutdown Margin. One current methodology for the calculation of $K_{eff}$ requires a number of conservative measures be included in the calculations to ensure the amount of boric acid added to the reactor coolant system bounds potential shutdown accident scenarios such as a control rod ejection, rapid reactor coolant system cool down, or unintentional dilution of the reactor coolant system boron concentration. The conservative amount of boric acid added to the reactor coolant system to ensure that $K_{eff}$ remains less than the limits imposed by plant Tech Spec requirements must be removed again from the reactor coolant system when it is time to restart the reactor after the shutdown. If the shutdown occurs during the period at the end of an operating cycle, it can take the addition of hundreds of thousands of gallons of pure demineralized water to remove the boron added to ensure a conservative shutdown condition. This places a huge burden on the Chemical Volume Control System 74 (FIG. 4) needed to remove and store the borated water being replaced by the pure water. It also significantly adds to the operating costs of the reactor. Implementation of the preferred embodiment of this invention will allow the Shutdown Margin to be continuously measured so the calculational uncertainties necessitating the conservative operation are eliminated so that the boric acid levels are optimized to minimize the needed Chemical Volume Control System 74 processing and storage requirements.

Figure 4:
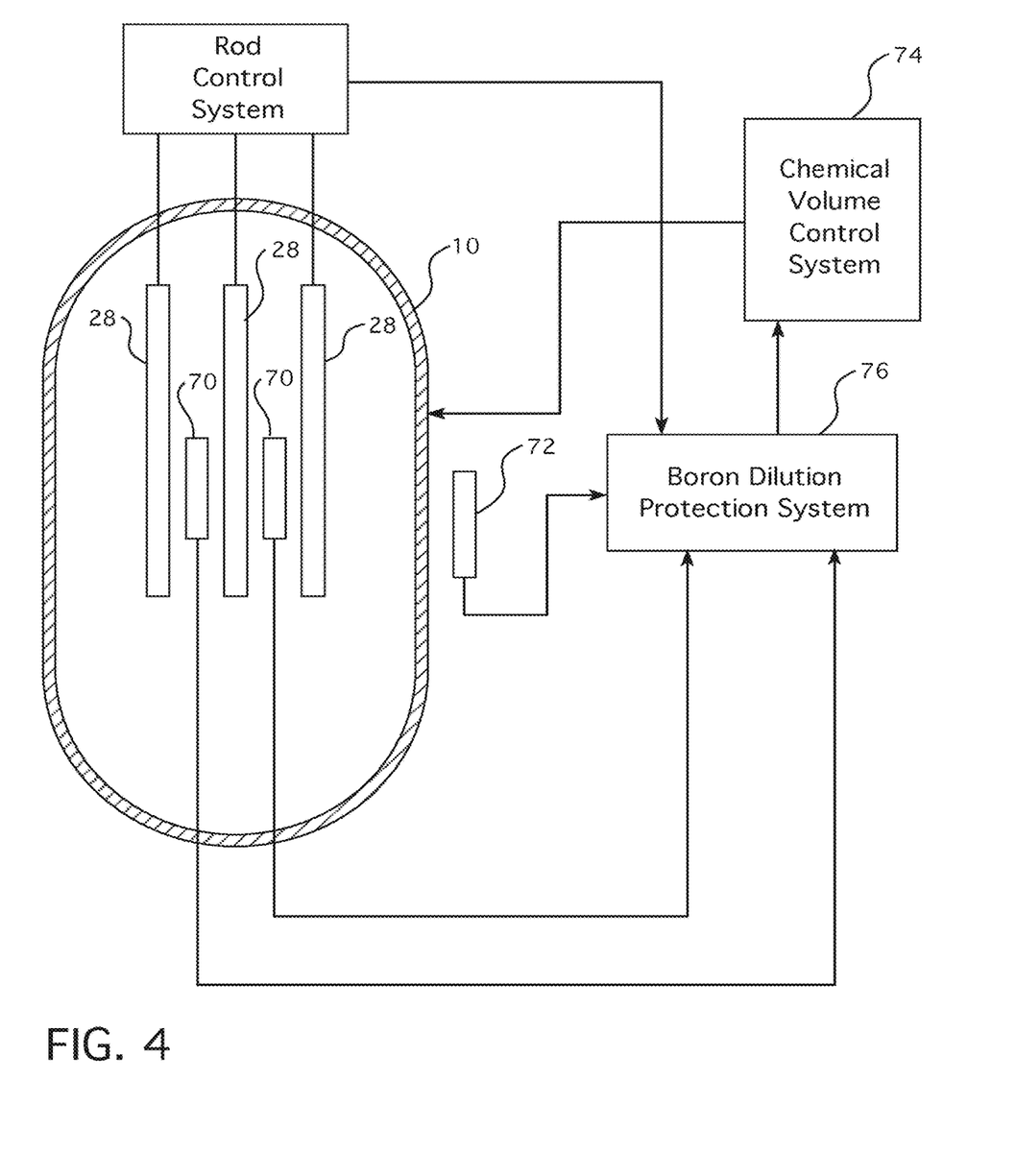
FIG. 4 is a block diagram of an exemplary system for implementing the steps of the process of one embodiment of the system of this invention.

The $K_{eff}$ calculation methodology described in U.S. Pat. No. 6,181,759 utilizes an excore Source Range detector to calculate $K_{eff}$ following periodic control rod withdrawals during the approach to achieving a critical condition in the reactor ($K_{eff}$=1). Use of the Source Range detectors requires pauses between control rod withdrawals to acquire statistically consistent count rate data sets to determine a value of $K_{eff}$ with a defined target accuracy. The methodology described in this invention uses the signal output from one or more prompt responding Self-Powered Detectors 70, such as a Platinum-based design, to continuously monitor the value of $K_{eff}$ with the reactor in a shutdown condition, up to and including achieving a critical condition. The use of a prompt responding Self-Powered Detector will allow the processed Self-Powered Detector's output signals to be used as the basis for control of a Boron-Dilution Protection System 76 that will be unaffected by changes in reactor coolant system temperature; conditions that commonly affect ex-core detector responses.

The key to the application of this approach is the ability to determine the fraction of the measured Self-Powered Detector's signal caused by the gamma radiation released by fission products in the vicinity of the Self-Powered Detector's element, and the fraction of the measured signal caused by subcritical fission events. Following a reactor shutdown the fission product concentration changes with time in a well understood manner. The impact of the gamma radiation emitted by the fission products on the measured Self-Powered Detector's signal will, therefore, change in a corresponding way. By adjusting the measured Self-Powered Detector's signal to remove the influences of the fission product gamma radiation using a simple time dependent analytical correction factor, the signal due only to the gamma radiation produced by the fission process can be calculated from the measured Self-Powered Detectors signal(s). This fission gamma signal is directly proportional to the thermal neutron population. Once the thermal neutron population on at least a relative basis is known, the value of $K_{eff}$ relative to a reference condition of known $K_{eff}$ can be determined from simple subcritical multiplication formulation using the expression:

$$K_{eff}(t) = 1 - \frac{f(t_{Ref})I_{Ref}}{f(t)I(t)}(1 - K_{Ref})$$

Where $f(t)$ is the fraction of the measured Self-Powered Detectors current at time t (I(t)) due to fission gamma radiation. The value of $K_{Ref}$ can be established using either the rod withdrawal method described in U.S. Pat. No. 6,181,759, where the Source Range count rate measurement data from the source range detectors 72 is replaced by the value of the fission product fraction adjusted Self-Powered Detector's current, or by calculation using a tool like the Westinghouse BEACON System to calculate the value of $K_{eff}$ at the reference shutdown condition from a nuclear model that captures the reactor operating history. The fact that the fission product adjusted currents are used in a ratio removes the need to perform any explicit conversions of the Self-Powered Detector's signal measurements to neutron flux units, and allows the fission product correction factor to be represented by a relative shape function. The fission product correction shape function will be well represented by the time dependent fission product gamma decay relation used in various well documented reactor shutdown heating calculations, where $K_{eff}$ is the time after shutdown, and t is the time after $K_{eff}$. Since the Self-Powered Detectors detector current is inherently less statistically variable than the measurement of Source Range detector pulse rate data, the use the Self-Powered Detector's current signal data can be used on a continuous basis rather than the periodic nature resulting from pulse data statistics.

Thus, this invention utilizes one or more primarily gamma sensitive (prompt responding) Self-Powered Detector style radiation measurement devices 70 located within the core of a nuclear reactor to determine the amount that the reactor multiplication factor ($K_{eff}$) is below the reactivity required to achieve or maintain a self-sustaining nuclear chain reaction. This capability provides the reactor operator with vital information on the operating state of the reactor. This invention utilizes measured changes in the Self-Powered Detector's current(s) to allow the reactor operator to measure the value of $K_{eff}$ at essentially any desired interval while the reactor is shut down with a $K_{eff}$ value less than the critical value of 1.0. Since this invention uses one or more prompt responding Self-Powered Detector's instruments contained within the reactor core, and the outputs from the Self-Powered Detectors do not require external power supply, the accuracy and reliability of the $K_{eff}$ information derived from this invention far exceeds the implementation described in U.S. Pat. No. 6,181,759. Moreover, a preferred embodiment of this invention will allow integration of this capability directly into the Reactor Protection System, which will allow the elimination of the operational and core design analysis constraint costs associated with the current Boron Dilution Accident Prevention methodology.

This invention provides a novel use of prompt responding in-core Self-Powered Detectors signals to provide continuous measurement of $K_{eff}$ in a subcritical reactor core. The primary novelty in the processing of the Self-Powered Detector's signals is the correction of the measured Self-Powered Detector's signal to remove the fission product gamma contribution to the measured signal based, well documented, decay heating functions.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. A method for monitoring a nuclear reactor for a shutdown condition, the method comprising:
    detecting gamma radiation within a core of the nuclear reactor utilizing one or more self-powered detectors located within the core of the nuclear reactor;
    outputting, by the one or more self-powered detectors, a current based on the detected gamma radiation;
    generating a current value of $K_{eff}$ based on the outputted current in accordance with the following equation;

$$K_{eff}(t) = 1 - \frac{f(t_{Ref})I_{Ref}}{f(t)I(t)}(1 - K_{Ref})$$

wherein $t_{Ref}$ is a time after shutdown of the nuclear reactor, t is a time after $t_{Ref}$, wherein a ratio of $f(t_{Ref})/f(t)$ is a fission product correction factor based on a time dependent fission product gamma decay relation, $I(t)$ is an output current of the one or more self-powered detectors at time t, $I_{Ref}$ is an output current of the one or more self-powered detectors at time $t_{Ref}$, and $K_{Ref}$ is a neutron multiplication factor at time $t_{Ref}$; monitoring the current value of $K_{eff}$; and based on the monitoring of the current value of $K_{eff}$, adding Boron to coolant in the nuclear reactor when an undesirable change in $K_{eff}$ is detected.

2. The method of claim 1, wherein the one or more self-powered detectors comprise a neutron detector comprising rhodium.

3. The method of claim 1, wherein the one or more self-powered detectors comprise a gamma radiation detector that is platinum-based.

4. The method of claim 1, wherein monitoring the current value of $K_{eff}$ is performed continuously during a shutdown period of the nuclear reactor.

5. The method of claim 1, further comprising:
    monitoring fission events within the core in a source range utilizing a source range ex-core detector positioned outside of the core, wherein the current value of $K_{eff}$ is generated without input from the source range ex-core detector.

6. The method of claim 1, wherein the adding boron comprises adding boric acid to the coolant.

7. A method for monitoring a nuclear reactor for a shutdown condition, the method comprising:
    detecting gamma radiation within a core of the nuclear reactor utilizing one or more self-powered detectors located within the core of the nuclear reactor;
    outputting, by the one or more self-powered detectors, a current based on the detected gamma radiation; adjusting the outputted current to remove influences of fission product gamma radiation using a time dependent analytical correction factor;

monitoring the adjusted current; and based on the monitoring of the adjusted current, adding Boron to coolant in the nuclear reactor when an undesirable change in the adjusted current is detected.

8. The method of claim 7, wherein the one or more self-powered detectors comprise a neutron detector comprising rhodium.

9. The method of claim 7, wherein the one or more self-powered detectors comprise a gamma radiation detector that is platinum-based.

10. The method of claim 7, wherein monitoring the adjusted current is performed continuously during a shutdown period of the nuclear reactor.

11. The method of claim 7, further comprising
monitoring fission events within the core in a source range utilizing a source range ex-core detector positioned outside of the core, wherein the outputted current is adjusted without input from the source range ex-core detector.

12. The method of claim 7, wherein adding boron comprises adding boric acid to the coolant.

* * * * *